US011027583B2

(12) United States Patent
Leinenger

(10) Patent No.: US 11,027,583 B2
(45) Date of Patent: Jun. 8, 2021

(54) ATTACHMENT ASSEMBLY FOR A VEHICLE

(71) Applicant: Bradley R. Leinenger, Clarkston, MI (US)

(72) Inventor: Bradley R. Leinenger, Clarkston, MI (US)

( * ) Notice: Subject to any disclaimer, the term of this patent is extended or adjusted under 35 U.S.C. 154(b) by 56 days.

(21) Appl. No.: 14/069,930

(22) Filed: Nov. 1, 2013

(65) Prior Publication Data

US 2014/0054875 A1 Feb. 27, 2014
US 2021/0061032 A9 Mar. 4, 2021

Related U.S. Application Data

(63) Continuation of application No. 13/663,828, filed on Oct. 30, 2012, now abandoned, which is a continuation of application No. 13/272,362, filed on Oct. 13, 2011, now Pat. No. 8,328,223.

(60) Provisional application No. 61/392,674, filed on Oct. 13, 2010.

(51) Int. Cl.
*B60D 1/48* (2006.01)
*B60D 1/44* (2006.01)
*B60D 1/52* (2006.01)
*B60D 1/30* (2006.01)
*B60D 1/04* (2006.01)

(52) U.S. Cl.
CPC ............... *B60D 1/48* (2013.01); *B60D 1/04* (2013.01); *B60D 1/30* (2013.01); *B60D 1/44* (2013.01); *B60D 1/488* (2013.01); *B60D 1/52* (2013.01)

(58) Field of Classification Search
CPC ..... B60D 1/04; B60D 1/30; B60D 1/48; B60D 1/44; B60D 1/488; B60D 1/52
USPC ..... 280/491.1, 515, 495, 480.1, 491.5, 491.3, 280/500; 403/11, 12, 326; 411/412, 400, 411/401, 517
See application file for complete search history.

(56) References Cited

U.S. PATENT DOCUMENTS

| 2,693,369 A | 11/1954 | Gross |
| 3,414,295 A * | 12/1968 | Rendessy ..................... 280/511 |
| 3,823,962 A | 7/1974 | Martin, Jr. |
| 4,062,559 A | 12/1977 | Peters |
| 4,186,575 A | 2/1980 | Bulle |
| 4,440,005 A | 4/1984 | Bulle |
| 5,146,736 A | 9/1992 | Tonutti |
| 5,333,888 A | 8/1994 | Ball |
| 5,423,566 A * | 6/1995 | Warrington ............. B60D 1/52 224/521 |
| 5,704,432 A | 1/1998 | Frackenpohl et al. |
| 5,727,803 A | 3/1998 | Johnson |
| 5,743,576 A * | 4/1998 | Schron, Jr. ................ B66C 1/66 294/215 |
| 5,775,664 A * | 7/1998 | Martin ................. B61D 45/001 248/499 |
| 5,839,744 A * | 11/1998 | Marks .................. B62D 53/021 280/416.1 |
| D409,960 S | 5/1999 | Young |
| 5,979,954 A * | 11/1999 | Tsui ......................... B66C 1/66 294/215 |

(Continued)

*Primary Examiner* — Jacob D Knutson
(74) *Attorney, Agent, or Firm* — McDonald Hopkins LLC

(57) ABSTRACT

An attachment assembly for a vehicle having a receiver for pulling an object or being pulled. The attachment assembly includes a support member for connection to the receiver and an attachment member connected to the support member to provide both pivotal and rotational movement.

19 Claims, 5 Drawing Sheets

(56) References Cited

U.S. PATENT DOCUMENTS

| | | |
|---|---|---|
| 6,085,954 A | 7/2000 | Bloemer et al. |
| D445,072 S | 7/2001 | McCoy et al. |
| 6,443,345 B1 | 9/2002 | Bloemer et al. |
| D466,845 S | 12/2002 | Kutzscher |
| D483,704 S | 12/2003 | Fandrich |
| 6,698,256 B2 | 3/2004 | Witchey |
| 6,820,890 B2 | 11/2004 | Westerdale |
| 7,669,878 B1 | 3/2010 | Williams, Jr. |
| 8,328,223 B2 | 12/2012 | Leinenger |
| 2003/0167806 A1 | 9/2003 | Witchey |
| 2004/0188982 A1 | 9/2004 | Westerdale |
| 2009/0139801 A1 | 6/2009 | Friesen |
| 2011/0156372 A1 | 6/2011 | Harper et al. |

* cited by examiner

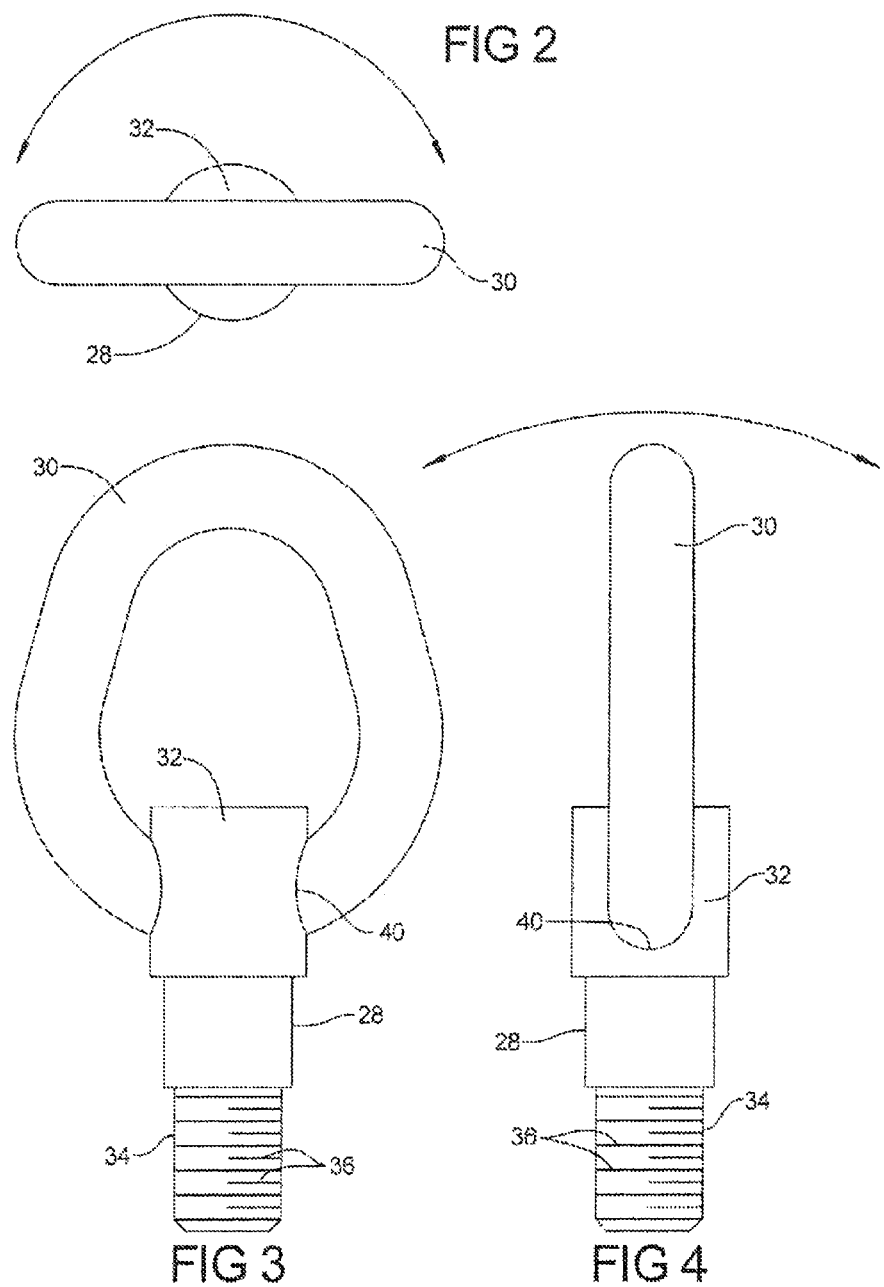

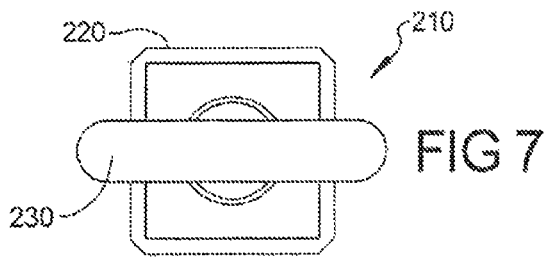
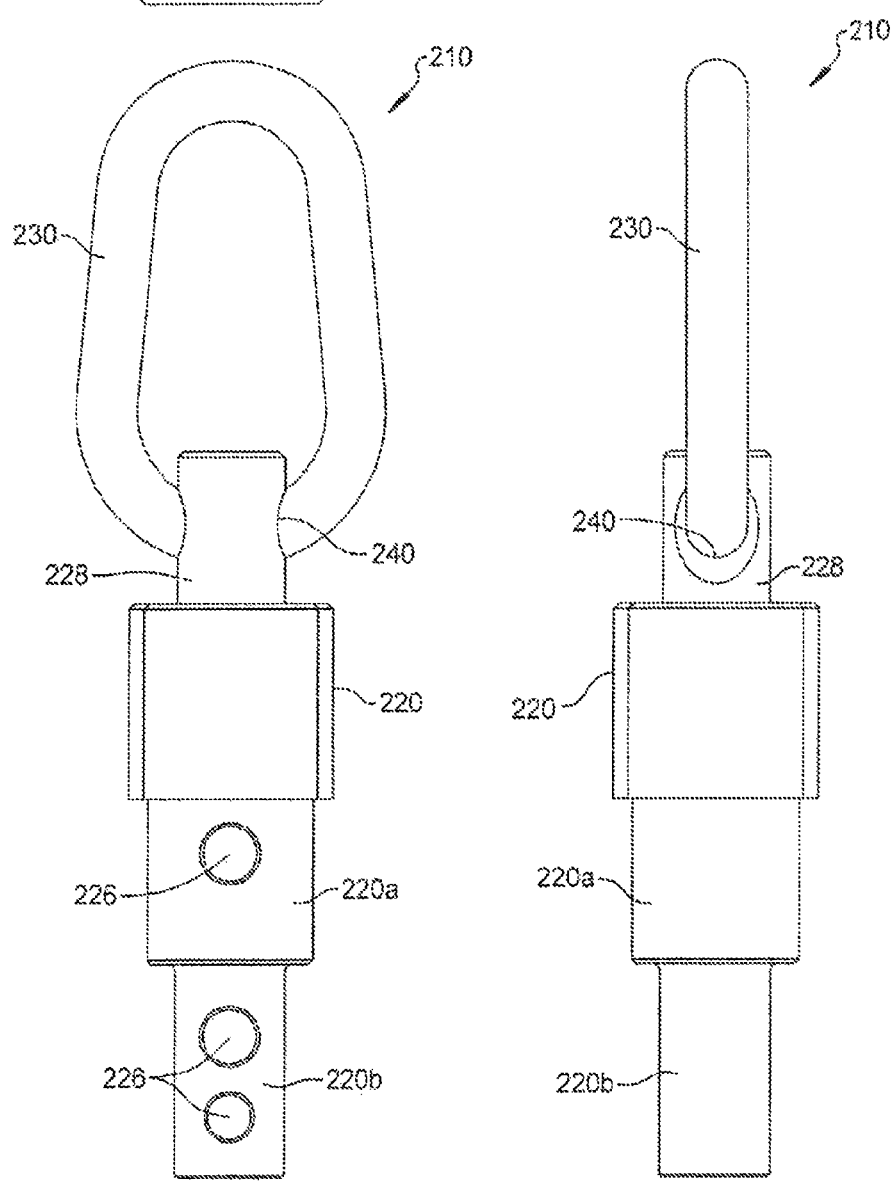

ATTACHMENT ASSEMBLY FOR A VEHICLE

CROSS-REFERENCE TO RELATED APPLICATION(S)

The present application is a continuation of U.S. application Ser. No. 13/663,828, filed, Oct. 30, 2012, entitled "Attachment Assembly for a Vehicle," which is a continuation of U.S. application Ser. No. 13/272,362, filed Oct. 13, 2011, now U.S. Pat. No. 8,328,223 which claims the priority date of U.S. Provisional Patent application Ser. No. 61/392,674, filed Oct. 13, 2010, all of which are hereby incorporated by reference.

BACKGROUND OF THE INVENTION

1. Field of the Invention

The present invention relates generally to vehicles and, more particularly, to an attachment assembly for a vehicle for pulling an object with the vehicle or the vehicle being pulled.

2. Description of the Related Art

It is known to pull an object with a vehicle such as a motor vehicle, recreational vehicle, or agricultural vehicle. In some instances, the vehicles may be provided with a receiver for a hitch to pull an object such as a trailer, agricultural implement, etc. Typically, the vehicle has a receiver secured to the vehicle and the hitch has a hitch member having a ball connector disposed on the hitch member. A locking pin extends through the hitch member and receiver to secure the hitch member tube to the receiver. The object may include a tongue beam that is releasibly attached to the ball connector as is known in the art.

It is also known that a shackle may be attached to the end of the hitch member instead of a ball. Typically, the shackle is allowed to only pivot one hundred eighty degrees (180°) up and down or from side to side, which restricts attachment and movement in some towing situations. The shackle may also be easily removed from the hitch member, which is undesired.

Therefore, it is desirable to provide an assembly for a vehicle that allows attachment for pulling an object or the vehicle being pulled. It is also desirable to provide an assembly for a vehicle that allows attachment and pivotal and rotational movement for pulling an object or the vehicle being pulled. It is further desirable to provide an assembly for a vehicle that cannot be easily removed once it is installed. It is still further desirable to provide an assembly for a vehicle that allows utility pulling such as logs, shrubs, etc. Thus, there is a need in the art to provide an assembly that meets at least one of these desires.

SUMMARY OF THE INVENTION

It is, therefore, one object of the present invention to provide an attachment assembly for a vehicle that allows attachment for pulling an object or the vehicle being pulled.

It is another object of the present invention to provide an attachment assembly for a vehicle that allows attachment and pivotal and rotational movement for pulling an object or the vehicle being pulled.

To achieve one or more of the foregoing objects, the present invention is an attachment assembly for a vehicle having a receiver for pulling an object or being pulled. The attachment assembly includes a support member for connection to the receiver. The attachment assembly further includes an attachment member connected to the support member for pivotal and rotational movement when the support member is connected to the receiver.

Once advantage of the present invention is that an attachment assembly is provided for a vehicle for pulling an object or the vehicle being pulled that has both pivotal and rotational movement. Another advantage of the present invention is that the attachment assembly allows 360.degree. rotational movement for pulling an object, for example, in vehicle towing situations or being pulled, for example, in vehicle extraction situations. Yet another advantage of the present invention is that the attachment assembly may not be easily removed once installed on the vehicle. Still a further advantage of the present invention is that the attachment assembly allows a vehicle such as a motor vehicle, recreational vehicle, agricultural vehicle, etc. to pull an object such as another vehicle, logs, shrubs, etc. A still further advantage of the present invention is that the attachment assembly may be installed on a vehicle having a receiver, for example a motor vehicle, such that another vehicle such as a toe truck can extract or pull the vehicle having the attachment assembly.

Other objects, features, and advantages of the present invention will be readily appreciated, as the same becomes better understood, after reading the subsequent description, taken in conjunction with the accompanying drawings.

BRIEF DESCRIPTION OF THE DRAWINGS

FIG. 2 is an end view of a portion of the attachment assembly of FIG. 1.

FIG. 3 is a front view of a portion of the attachment assembly of FIG. 1.

FIG. 4 is a side view of a portion of the attachment assembly of FIG. 1.

FIG. 7 is an end view of yet another embodiment, according to the present invention, or the attachment assembly of FIG. 1.

FIG. 8 is a side view of the attachment assembly of FIG. 7.

FIG. 9 is another side view of the attachment assembly of FIG. 7.

DESCRIPTION OF THE PREFERRED EMBODIMENT(S)

Figure 1:
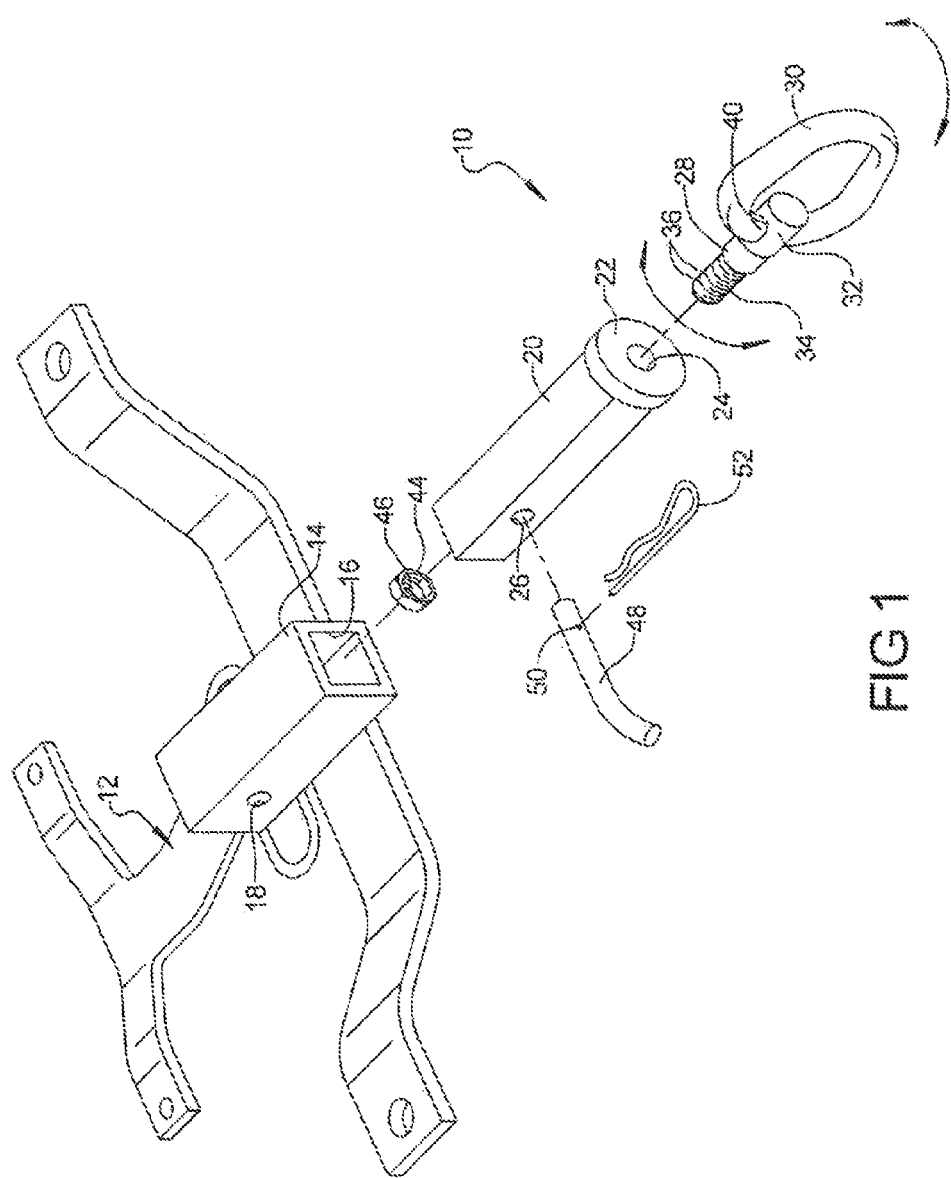
FIG. 1 is a perspective view of an attachment assembly, according to the present invention, illustrated in operational relationship with a portion of a vehicle.
Figure 5:
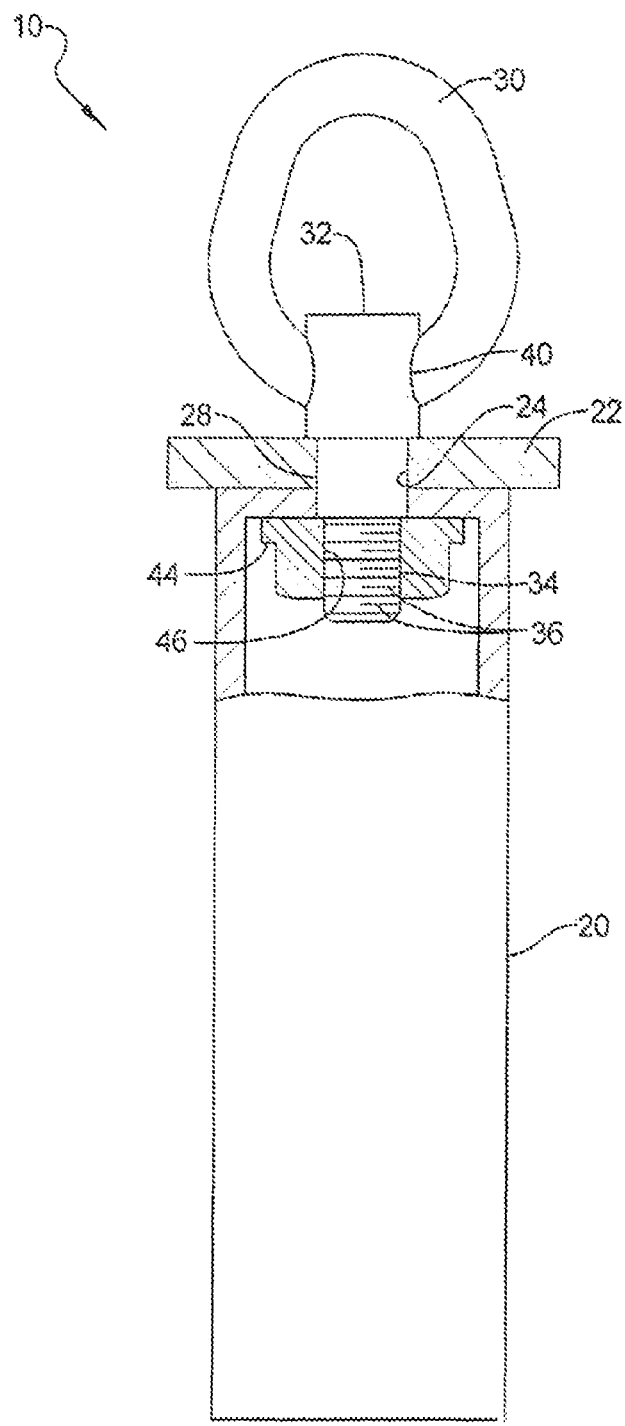
FIG. 5 is a top view of the attachment assembly of FIG. 1.

Referring now to the drawings, and in particular FIG. 1, one embodiment of an attachment assembly 10, according to the present invention, is shown for a vehicle 12 (partially shown). As illustrated in FIG. 1, a portion of the vehicle 12 is shown. The vehicle 12 may be of any type such as a wheeled vehicle, motor vehicle, recreational vehicle, agricultural, vehicle, etc., as is known in the art, although any type of vehicle may be used. The vehicle 12 includes a receiver 14 located in either a front or rear thereof. In the embodiment illustrated, the receiver 14 extends longitudinally and is a tube having a generally rectangular cross-sectional shape. The receiver 14 has a cavity 16 extending longitudinally therein. The receiver 14 has a lock-pin aperture 18 extending laterally therethrough for a function to be described. It should be appreciated that the receiver 14 may have any suitable cross-sectional shape. It should also be appreciated that the receiver 14 is conventional and known in the art.

Referring to FIGS. 1 through 5 in one embodiment, the attachment assembly 10 includes a support member 20 to be removably connected or attached to the receiver 14. In the embodiment illustrated, the support member 20 extends longitudinally and has a generally rectangular cross-sectional shape. The support member 20 has a flange plate 22 at one end thereof. The flange plate 22 has a generally circular shape. The flange plate 22 extends outwardly beyond the support member 20 and has a central aperture 24 extending therethrough. The support member 20 has a lock-pin aperture 26 extending laterally therethrough. When the support member 20 is inserted in the cavity 16 of the receiver 14, it is inserted such that the lockpin aperture 26 on the support member 20 aligns with the lockpin aperture 18 extending through the receiver 14. It should be appreciated that the support member 20 may have any suitable cross-sectional shape. It should also be appreciated that the flange plate 22 may have any suitable shape.

The attachment assembly 10 also includes a shaft member 28 attached to the support member 20 and an attachment member 30 extending through the shaft member 28. The shaft member 28 has a head 32 and a shaft 34 extending axially from, the head 32. The shaft 34 may bane a plurality of threads 36 at one end. The shaft 34 extends through the aperture 24 in the flange plate 22. The shaft 34 has a diameter less than a diameter of the aperture 24 to rotate therein. The head 32 also has an aperture 40 extending therethrough. The shaft member 28 is made of a rigid material such as metal or a composite. It should be appreciated that the shaft member 28 may be in the form of a bolt, eye-member, or unthreaded stud that is press-fit onto the support member 20.

In one embodiment, the attachment member 30 has a generally closed shape. In the embodiment illustrated, the attachment member 30 has a generally circular cross sectional shape although any suitable closed shape may be used. The attachment member 30 may be formed from straight bar stock that is extended through the aperture 40 in the head 32 of the shaft member 28. The bar stock of the attachment member 30 is then bent into a generally closed shape with ends spaced from each other to form a gap therebetween as a butt joint, which may be welded. In another embodiment, the attachment member 30 may be formed as a casting or forging. The attachment member 30 is made of a rigid material such as metal or a composite. The metal material may be a solid ferrous or non-ferrous material. It should be appreciated that the welding process will affectively create a weld butt joint to close the gap. It should also be appreciated that the attachment member 30 may be in the form of shackle.

The attachment assembly 10 may include a retainer 44 to retain the shaft member 28 to the support member 20. In the embodiment illustrated, the retainer 44 may be a separate member such as a nut having an aperture 46 extending therethrough with a plurality of internal threads for mating engaging the threads 36 of the shaft member 28. The shaft member 28 is extended through the central aperture 24 in the flange plate 22 and the retainer 44 threadably engages the threads 36 of the shaft 34 to secure the shaft member 28 to the support member 20. The attachment assembly 10 may include a locking feature for the retainer 44 such as an adhesive, spot-weld, etc. for locking the retainer 44 and shaft 34 together to prevent the retainer 44 from disengaging the shaft 34. In another embodiment, the retainer 44 may be a portion of the shaft member 28 behind the flange plate 22 with the shaft 34 extending through the aperture 24 in the flange plate 22 and baring the aperture 40 extending therethrough to receive the attachment member 30. It should be appreciated that the retainer 44 is disposed inside of the support member 20. It should also be appreciated that the retainer 44 allows the shaft member 28 to be journaled to rotate three hundred sixty degrees (360°) such that the shaft member 28 rotates relative to the support member 20.

Referring to FIG. 1, the attachment assembly 10 further includes a lockpin 48 to be inserted through the lockpin. aperture 18 and lockpin aperture 26 to prevent the support member 20 from exiting the receiver 14. The lockpin 48 as generally cylindrical in shape with a generally circular cross-sectional shape. The lockpin 48 typically has one end that is bent to form a general "L" shape and the other end has an aperture 50 extending diametrically therethrough. The attachment assembly 10 also includes a hairpin clip 52 which is inserted through the aperture 50 in the lockpin 48 and clipped on the end of the lockpin 48 to prevent the lockpin 48 from exiting the receiver 14 and support member 20. It should be appreciated that the lockpin 48 and hairpin clip 52 are conventional and known in the art.

In operation, the attachment assembly 10 in installed on the end of the vehicle 12. When assembled, the shaft member 28 is aliened to rotate 360 degrees due to the journal in the central aperture 24 of the flange plate 22 of the support member 20. The attachment member 30 is allowed to pivot at least one hundred eighty degrees (180°) due to the attachment member 30 extending through the aperture 40 in the head 32 of the shaft member 28. During pulling, a rope, cable, chain, or the like may be attached to the attachment member 30. This allows the attachment member 30 to rotate and/or pivot relative to the pulled or pulling object during usage. It should no appreciated that the attachment assembly 10 provides both pivoting and rotation during pulling. It should also be appreciated that the attachment assembly 10 allows the force axis of the object to be centered daring pulling due to the pivoting and rotating of the attachment member 30.

Figure 6:
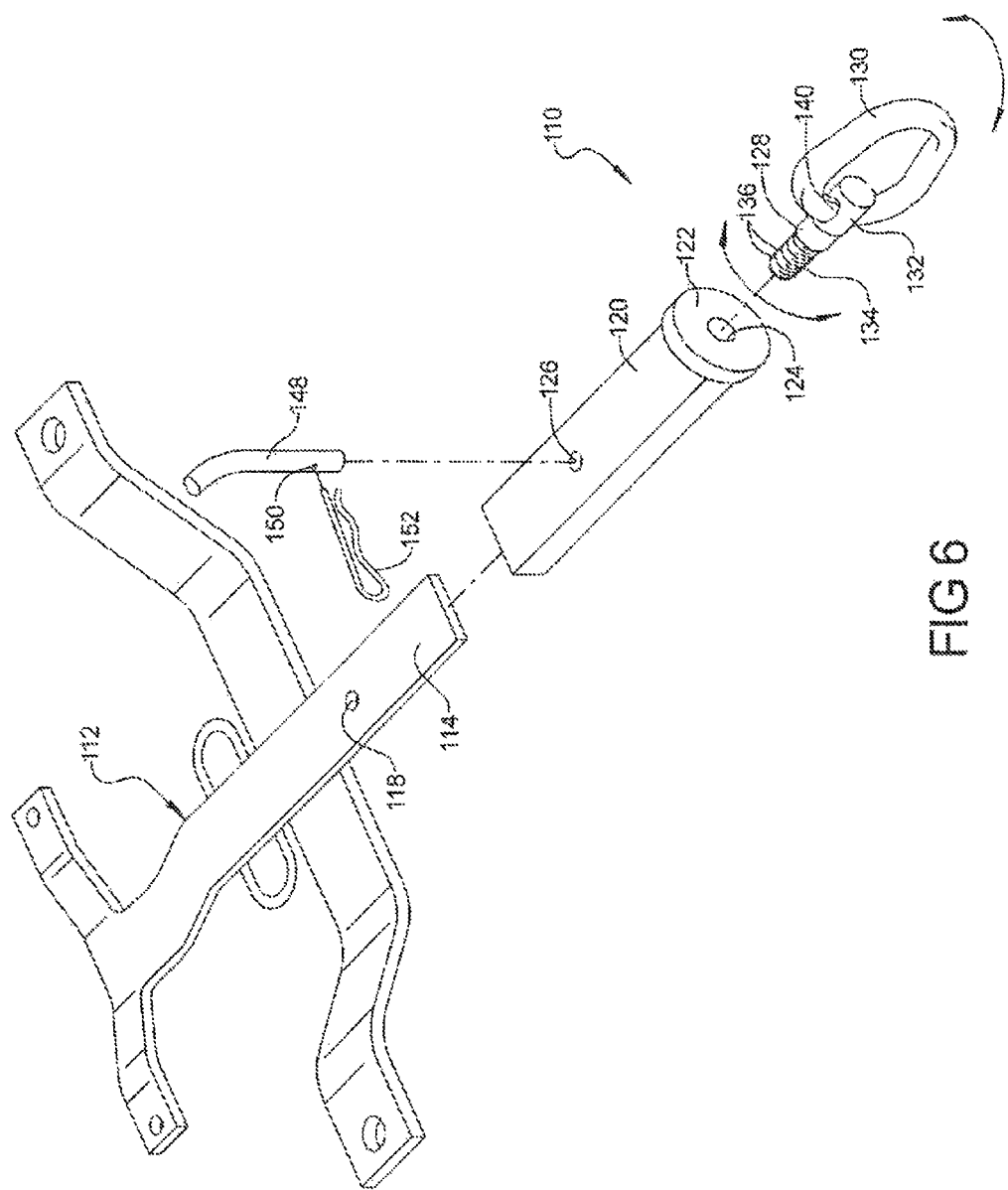
FIG. 6 is a perspective view of another embodiment, according to the present invention, of the attachment assembly of FIG. 1 illustrated in operational relationship with a portion of a vehicle.

Referring to FIG. 6, another embodiment 110, according to the present invention, of the attachment assembly 10 is shown. Like parts of the attachment assembly 10 have like reference numerals increased by one hundred (100). In the embodiment illustrated, the attachment assembly 110 includes a receiver 114 configured as a tongue. The receiver 114 is a generally planar and rectangular plate having an aperture 118 extending therethrough. It should be appreciated that the receiver 114 is of a type found on agricultural vehicles.

The attachment assembly 110 also includes the support member 120, shaft member 128 attached to the support member 120, and the attachment member 130 extending through the shaft member 128. In this embodiment, the support member 120 is at least partially disposed over the receiver 114. The attachment assembly 110 further includes the lockpin 148 to be inserted through the lockpin aperture 118 and lockpin aperture 126 to prevent the support member 120 from exiting the receiver 114. The attachment assembly 110 may also includes the hairpin clip 152 which is inserted through the aperture 150 in the lockpin 148 and clipped on the end of the lockpin 148 to prevent the lockpin 148 from exiting the receiver 114 and support member 120. It should be appreciated that the operation of the attachment assembly 110 is similar to the operation of the attachment assembly 10.

Referring to FIGS. 7 through 9, yet another embodiment 210, according to the present invention, of the attachment assembly 210 is shown. Like parts of the attachment assembly 210 have like reference numerals increased by two hundred (200). In the embodiment illustrated, the attachment assembly 210 includes the support member 220, shaft member 228 attached to the support member 220, and the attachment member 230 extending through the shaft member 228. In this embodiment, the support member 220 has a plurality of shanks or stepped portions 220a and 220b. The stepped portions 220a and 220b are generally rectangular in shape and are of a size such as 1¼ inches, 2 inches, and 2½ inches. The stepped portions 220a and 220b have at least one aperture 226 extending therethrough. In the embodiment illustrated, the stepped pension 220a has one aperture 226 extending therethrough and the stepped portion 220b has a pair of longitudinally spaced apertures 226 extending laterally therethrough. The shaft member 228 and support member 220 are integral and being as one-piece. The support member 220 is a solid member being integral, unitary, and one-piece. It should be appreciated that the operation of the attachment assembly 210 is similar to the operation of the attachment assembly 10.

The present invention has been described in an illustrative manner. It is to be understood that the terminology, which has been used, is intended to be in the nature of words of description rather than of limitation.

Many modifications and variations of the present invention are possible in light of the above teachings, Therefore, within the scope of the appended claims, the present invention may be practiced other than as specifically described.

What is claimed is:

1. An attachment assembly comprising:
 a support member extending longitudinally about a longitudinal axis, the support member adapted and configured to be engaged with a receiver of a vehicle;
 a flange plate extending from the support member, the flange plate generally perpendicular to the longitudinal axis, the flange plate comprising an aperture; and
 an attachment member attached to the support member by a shaft member inserted into the aperture of the flange plate, the attachment member having a closed loop, the shaft member comprising an aperture disposed and fully enclosed in the shaft member, the closed loop disposed in the aperture of the shaft member, the attachment member being both rotatable about the longitudinal axis relative to the support member and moveable along the attachment member's closed loop length within the aperture to provide both rotational movement and movement along the closed loop length for pulling an object with the vehicle or the vehicle being pulled.

2. The attachment assembly of claim 1, wherein the shaft member is rotatably coupled to the support member and rotatable about the longitudinal axis relative to the support member, the shaft member including the aperture through which the closed loop of the attachment member is disposed.

3. The attachment assembly of claim 2, wherein the attachment member is pivotal relative to the shaft member about a pivot axis that extends through the aperture.

4. The attachment assembly of claim 3, wherein the pivot axis is perpendicular to the longitudinal axis.

5. The attachment assembly of claim 1, wherein the attachment member has a generally circular cross-sectional shape sized to moveably fit within the aperture.

6. The attachment assembly of claim 1, wherein the attachment member rotates 360 degrees about the longitudinal axis.

7. The attachment assembly of claim 1, wherein the closed loop is formed from straight bar stock extended through the aperture and welded into the closed loop.

8. An attachment assembly comprising:
 a longitudinally extending support member, the support member adapted and configured to be engaged with a receiver of a vehicle;
 a flange plate extending generally perpendicularly from the support member, the flange plate comprising an aperture
 a shaft member inserted through the aperture and attached to the support member, the shaft member rotating relative to the support member about a longitudinal axis, the shaft member comprising an aperture disposed and fully enclosed in the shaft member; and
 an attachment member formed as a permanently closed loop which extends through the aperture, the closed loop connected to the aperture of the shaft member, the attachment member rotating generally 360 degrees about the longitudinal axis with rotation of the shaft member and being pivotal relative to the support member about a pivot axis to provide both pivotal and rotational movement for pulling an object with the vehicle or the vehicle being pulled,
 wherein a force axis of the object is centered during pulling due to the pivoting and rotating of the attachment member.

9. The attachment assembly of claim 8, wherein the attachment member has a generally circular cross-sectional shape sized to moveably fit within the aperture and the attachment member can move along the attachment member's closed loop length within the aperture.

10. The attachment assembly of claim 8, wherein the pivot axis is perpendicular to the longitudinal axis.

11. The attachment assembly of claim 8, wherein the attachment member pivots through at least 180 degrees.

12. An attachment assembly comprising:
 a support member extending longitudinally about a longitudinal axis, the support member adapted and configured to be engaged with a receiver of a vehicle;
 a flange plate extending from the support member, the flange plate generally perpendicular to the longitudinal axis, the flange plate comprising an aperture;
 an attachment member inserted through the aperture and connected to the support member and being both rotatable about the longitudinal axis relative to the support member and pivotal relative to the support member to provide both pivotal and rotational movement for pulling an object with the vehicle or the vehicle being pulled; and
 a shaft member attached to the support member, wherein the shaft member rotates relative to the support member about the longitudinal axis and the attachment member is connected to the shaft member and pivots relative to the shaft member, whereby the shaft member includes an aperture disposed and fully enclosed in the shaft member and the attachment member is a permanently closed loop that extends through the aperture.

13. An attachment assembly comprising:

a support member extending longitudinally about a longitudinal axis, the support member adapted and configured to be engaged with a receiver of a vehicle;

a flange plate extending from the support member, the flange plate generally perpendicular to the longitudinal axis, the flange plate comprising an aperture; and an attachment member connected to the support member by a shaft member, the attachment member having a closed loop, the shaft member comprising an aperture disposed and fully enclosed in the shaft member, the closed loop is disposed in the aperture of the shaft member, the attachment member being rotatable about the longitudinal axis relative to the support member and pivotal relative to the support member to provide both pivotal and rotational movement for pulling an object with the vehicle or the vehicle being pulled.

14. The attachment assembly of claim 13, wherein the shaft member is rotatably coupled to the support member and rotatable about the longitudinal axis relative to the support member, the shaft member including the aperture through which the closed loop of the attachment member is disposed.

15. The attachment assembly of claim 14, wherein the attachment member is pivotal relative to the shaft member about a pivot axis that extends through the aperture.

16. The attachment assembly of claim 15, wherein the pivot axis is perpendicular to the longitudinal axis.

17. The attachment assembly of claim 13, wherein the attachment member has a generally circular cross-sectional shape sized to moveably fit within the aperture.

18. The attachment assembly of claim 13, wherein the attachment member rotates 360 degrees about the longitudinal axis.

19. The attachment assembly of claim 13, wherein the closed loop is formed from straight bar stock extended through the aperture and welded into the closed loop.

* * * * *